(12) United States Patent
Chiou

(10) Patent No.: US 8,218,970 B2
(45) Date of Patent: Jul. 10, 2012

(54) MEDIUM ACCESS CONTROL METHOD FOR OPTICAL-FIBER TDMA NETWORKS

(76) Inventor: Rong-Nan Chiou, Tainan (TW)

( * ) Notice: Subject to any disclaimer, the term of this patent is extended or adjusted under 35 U.S.C. 154(b) by 552 days.

(21) Appl. No.: 12/385,683

(22) Filed: Apr. 16, 2009

(65) Prior Publication Data

US 2010/0266286 A1    Oct. 21, 2010

(51) Int. Cl.
   *H04J 14/02*   (2006.01)
   *H04B 7/212*   (2006.01)
   *H04L 12/43*   (2006.01)
(52) U.S. Cl. .......... 398/99; 370/321; 370/442; 370/458
(58) Field of Classification Search .................. 370/458, 370/442; 398/99
   See application file for complete search history.

(56) References Cited

U.S. PATENT DOCUMENTS

| 5,889,765 A * | 3/1999 | Gibbs ..................... 370/310.2 |
| 7,031,343 B1 * | 4/2006 | Kuo et al. ..................... 370/473 |
| 2007/0058661 A1 * | 3/2007 | Chow ............................ 370/445 |

* cited by examiner

*Primary Examiner* — Kenneth N Vanderpuye
*Assistant Examiner* — Abbas H Alagheband
(74) *Attorney, Agent, or Firm* — Rosenberg, Klein & Lee

(57) ABSTRACT

A medium access control method for optical-fiber TDMA networks is revealed. The TDMA indicates the technique of time-division multiple access which is used to provide medium-sharing environment. Once the MAC protocol implementing traffic control is applied to control access among nodes with the same optical fiber, the medium access in optical networks can be distributed logically and effectively among the nodes so as to improve unfair access in the optical TDMA networks. Therefore, the optical TDMA network is suitable to construct metropolitan area networks (MANs), local area networks (LANs) or subnetworks of public networks for reducing construction cost of networks, increasing bandwidth utilization and improving communicative performance.

2 Claims, 7 Drawing Sheets

MEDIUM ACCESS CONTROL METHOD FOR OPTICAL-FIBER TDMA NETWORKS

BACKGROUND OF THE INVENTION

1. Fields of the Invention

The presenting invention relates to a medium access control (MAC) protocol for optical-fiber networks which use time-division multiple access (TDMA) technique to provide medium-sharing environment. The MAC uses traffic control methods thereof in which the medium access of optical networks can be logically and effectively distributed among nodes. Otherwise, a traffic control method is introduced and applied in the MAC. Because the presenting invention can improve the unfair distribution of access among nodes, the TDMA optical network can be applied to construct Metropolitan Area Networks (MANs) and Local Area Networks (LANs), and also can be considered as subnetworks of public networks so as to reduce construction cost and optimize bandwidth utilization and enhance communicative performance.

2. Descriptions of Related Art

In accordance with Hartley-Shannon theorem (the channel/information capacity theorem), channel capacity of transmission media is restricted by the bandwidth of transmission media and the signal-to-noise ratio. Media with low noise and wide bandwidth can support high capacity. Compared with twisted pairs, optical fibers have very low noise and wide bandwidth so that the capacity of optical fibers is much higher than that of twisted pairs. Due to prosperous development of various services, an urgent increase on capacity and communicative performance dramatically presents. Thus, twisted pairs have been gradually replacing by optical fibers in public communication networks.

Medium-sharing networks naturally have high bandwidth utilization. Their topologies are so simple that low constructional cost will be taken easily. Every variety of medium access control (MAC) protocol, such as carrier sense multiple access (CSMA), carrier sense multiple access with collision detection (CSMA/CD), token ring, token bus, time-division multiple access (TDMA) and so on, is exploited by medium-sharing networks to control access among nodes. The TDMA protocol is appropriate for supporting optical medium-sharing networks. On TDMA networks, there is no collision. Therefore, the bandwidth utilization of TDMA networks can approximate to its medium capacity. Though control protocols with tokens are also adopted to establish the optical medium-sharing environment, their packet delays are larger than that of TDMA systems. However, the optical TDMA network has an unfair-access problem due to its topology. The unfair problem indicates that the access of upstream nodes will be higher than that of downstream nodes. The problem had been fervidly explored before and after the IEEE 802 committee recommended optical TDMA networks to form the IEEE 802.6 LAN/MAN protocol, which is named distributed-queue dual-bus networks (DQDB networks), in 1990. Many approaches were proposed to improve the unfair problem, but it is yet to be resolved and has been laid for more than ten years. Because users within the optical TDMA network may be independent of one another, the unfair distribution of access among nodes becomes very troublesome for establishing the optical medium-sharing environment.

The unfair distribution of access influences the distributed-queue delay of DQDB nodes. In order to understand the characteristics of distributed-queue delays of DQDB nodes, several approaches were taken to analyze DQDB networks. All these analyses are based on the model Bisdikian proposed. Bisdikian introduced an approximate single-node analytical model. Due to the model, the steady-state generation function of the number of requests queued ahead of an arriving packet is expressed. Given this number, the distributed-queue delay of an arriving packet can be easily obtained. In a word, these approaches analyze the distributed-queue delay of every node according to the detailed operations of the MAC protocol of the network. Because the MAC protocol of the network is so complex, the modeling and performance analysis of the network become very difficult. To make an exact analysis on the distributed-queue delay by considering detailed operations of the MAC protocol is almost impossible. Consequently, these analyses cannot make a contribution to solve the unfair-access problem.

From the perspective of TDMA networks, the distributed-queue delay on DQDB networks is the same as the waiting time on TDMA networks. The waiting time of TDMA networks is a time interval. The start of the time interval is the instance that a packet going to be transmitted enters the nodal packet buffer attached to a bus transmission system. The end of the interval is the moment the packet is written into a free slot appearing on the bus transmission system. This definition is similar to that of the delay of distributed queues on DQDB networks. So, both the distributed-queue delay on DQDB networks and the waiting time on TDMA networks have same properties. If the waiting time on TDMA networks depends on network topology, i.e. the average waiting time of TDMA nodes (the waiting mean) is functions of nodal positions, optical TDMA networks would inherently accompany the unfair-access problem. When the exactness of the inherent property can be verified, to completely solve the unfair-access problem of optical TDMA networks should be impossible. Otherwise, this unfair-access problem can be solved after the waiting time on TDMA networks is analyzed. Under this concept, this invention first analyzes the waiting time on TDMA networks to distinguish whether the unfair-access problem can be completely solved or not.

In a stable TDMA network, the carried load must be equal to the offered load whichever the MAC protocol is used. Thus the waiting time of TDMA networks can be analyzed by the use of TDMA slots on media regardless of the operation of MAC protocols. Based on the observation of the use of TDMA slots, it is obvious that the waiting time of a packet generated by a node is dependent on the probability that the next available slot appears for the node. The probability can be determined by the traffic distribution among nodes and the capacity of the transmission medium.

Based on the probability that the next available slot appears for a node, the waiting mean of TDMA nodes has been analyzed. The analysis shows that the waiting mean is a simple function of nodal traffic. The waiting mean of the node is in inverse proportion to nodal traffic. This means that nodes with larger traffic will have lower waiting means. According to the analysis, if MAC protocols have the ability of traffic control, waiting means are irrelevant to nodal positions. This represents that the unfair-access problem will not exist if the MAC protocol of an optical TDMA network performs traffic control.

Thus a MAC protocol performing traffic control is proposed to control access among nodes of an optical TDMA network. Due to the MAC, the unfair distribution of nodal access on optical TDMA networks can be solved completely.

SUMMARY OF THE INVENTION

Therefore it is a primary object of the present invention to provide a MAC protocol and a traffic control method thereof in which a MAC protocol performing traffic control is applied to access control so that the medium access in optical-fiber networks can be distributed fairly and logically among nodes and the unfair distribution of access among nodes in the optical-fiber TDMA networks is improved. Thus the optical TDMA network is applied to construct metropolitan area networks (MANs), local area networks (LANs) or subnetworks of public networks so as to reduce construction cost of networks, optimize bandwidth utilization and improve communication performance.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
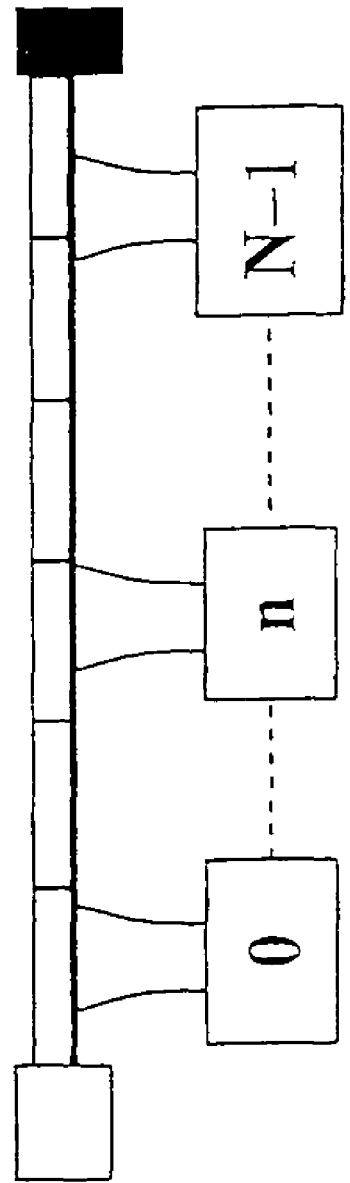
FIG. 1 is a schematic drawing showing the structure of optical TDMA networks.

In TDMA networks, a node sends requests to reserve empty slots when it is going to transmit messages. The number of reserved slots corresponds to the number of requests being sent. When the number of reserved empty slots is increasing, the waiting mean of the node is reduced correspondingly. Thus if a node relays more traffic, its waiting mean will be decreased. When the waiting mean of TDMA nodes is used as a criterion for evaluating the access of nodes allowed to obtain, a node must get more access when it carries a higher amount of traffic. That is to say, the nodes in TDMA networks compete for medium access according to the amount of traffic. The relationship between the waiting mean of TDMA nodes and node traffic is derived as follows.

The deduction for the waiting mean of TDMA nodes is based on three operating conditions of networks. The first operating condition shows that the network to be analyzed is at full load. Another operating condition is that every request reserves only one slot. The third operating condition assumes that the number of slots requested by each node is not limited by the medium access control protocol. According to these three operating conditions, all nodes compete for the access of slots. As to a stable TDMA network with the number of N nodes, R represents the slot rate of the network bus, $T(n)$ is the traffic transmitted by the $n^{th}$ node of the network, wherein n is the ordinal number of the nodes, and n ranges from 0 to N−1 ($0 \leq n$ N). $T(n)$ can be represented as by the following equation:

$$T(n)=r(n)/R, \quad (1)$$

wherein $r(n)$ is the number of slots that the $n^{th}$ node captures to transmit messages per second.

According to the first operating condition and the equation (1), the sum of $T(n)$s is shown as:

$$\sum_{n=0}^{N-1} T(n) = 1 \quad (2)$$

From the perspective of the $n^{th}$ node, the slots on the media are divided into three groups—busy slots, reserved slots and free slots. Busy slots are slots that have been used by upstream nodes. Reserved slots are those which have been reserved by downstream nodes for sending messages. Free slots are those available for the $n^{th}$ node. Free slots may be reserved by the $n^{th}$ node or may be not yet.

In a stable network, the probability that free slots pass through the $n^{th}$ node should be equal to or greater than the traffic transmitted by the $n^{th}$ node. Since the traffic carried by the $n^{th}$ node is $T(n)$ and the network is with full load, the probability of the free slot captured by the $n^{th}$ node is also $T(n)$.

As to a segment generated by the $n^{th}$ node, it enters a buffer connected with the bus and waits for transmission. It is assumed that the $i^{th}$ slot shown up on the $n^{th}$ node after the segment enters the buffer is a free slot for the node. Let $p_w(n,i)$ denote the probability of the segment to be written into the $i^{th}$ slot, wherein i=1, 2, ..., R. The $p_w(n,i)$ is represented as follows:

$$p_w(n,i)=T(n)(1-T(n))^{i-1} \quad (3)$$

Assume that $M(n)$ is the maximum waiting time of the $n^{th}$ node. The $M(n)$ can be represented by following equation because the $n^{th}$ node captures the number of $r(n)$ slots per second:

$$M(n)=R-r(n)+1 \quad (4)$$

To substitute $r(n)$ in the equation (1) into the equation (4) and $M(n)$ is rearranged as:

$$M(n)=R(1-T(n))+1 \quad (5)$$

$\mu(n)$, representing the waiting mean of the $n^{th}$ node, is calculated by the following equation:

$$\mu(n) = \sum_{i=1}^{M(n)} i p_W(n, i) \quad (6)$$

$$= \sum_{i=1}^{M(n)} iT(n)(1 - T(n))^{i-1}$$

$$= [1 - (1 - T(n))^{M(n)}(1 + M(n)T(n))]/T(n).$$

Substituting $M(n)$ in the equation (5) into the equation (6) and the waiting mean of the $n^{th}$ node is rearranged as following:

$$\mu(n) = [1 - (1 - T(n))^{R(1-T(n))+1}(1 + (R(1 - T(n)) + 1)T(n))]/T(n). \quad (7)$$

Once the slot rate R is fixed, equation (7) shows that the waiting mean of the $n^{th}$ node varies along with the nodal traffic of the $n^{th}$ node while the waiting means is irrelevant to node positions as well as the distance between the $n^{th}$ node and other nodes. Moreover, the waiting mean is also independent of the MAC protocol supporting the medium-sharing.

For high-speed networks, as R approaches infinity and the $\mu(n)$ of the high-speed networks is shown by following equation:

$$\lim_{R \to \infty} \mu(n) = \lim_{R \to \infty} \{[1-(1-T(n))^{R(1-T(n))+1}(1+(R(1-T(n))+1) \quad (8)$$
$$T(n))]/T(n)\}$$
$$= 1/T(n).$$

The equation (8) clearly indicates that the waiting mean of a high-speed TDMA node is inverse proportion to its node traffic. In short, for high-speed TDMA networks, the larger the node traffic is, the smaller the waiting mean is. This feature obviously shows that the waiting mean of a node in the high-speed TDMA network is irrelevant to network topology. In other words, the medium access of a high-speed TDMA node changes along with its traffic. Thus once the MAC protocol thereof implements proper traffic control, the medium access of the network can be distributed effectively and logically among nodes.

The optical networks are high-speed networks. Thus the above property that the waiting mean is inversely proportional to the traffic of the high-speed TDMA node is inherent for the optical TDMA network. Therefore, once the MAC protocol of the optical TDMA network performs traffic control, the access of the optical TDMA network is fairly and logically distributed among the nodes.

In order to verify and explain the above theory, an embodiment of the present invention uses a MAC protocol that implements traffic control, being applied to optical TDMA networks to control access, as an example.

In order to examine effects of MAC protocol of optical TDMA networks that implements traffic control, several working conditions of networks are assumed and proposed for simulations of optical TDMA networks. Refer to FIG. 1, the structure of optical TDMA networks is revealed. In the figure, the medium between a slot generator and a slot terminator is an optical fiber. On the optical fiber, a slot flow is generated from the slot generator and then is sent into the slot terminator. The number of nodes within the network is N. From left to right, the nodes are numbered in sequence. The ordinal number of every node also represents the node position in the network topology. The time interval that the slot generator sends a slot onto the optical fiber is called a slot time. The distance that a slot spreads on the optical fiber is called a slot length. Besides, other working conditions related to the space between adjacent nodes, the length of messages and the traffic distribution among nodes are described below.

In a simulation scenario, every pair of adjacent nodes has the same space and the length of the space is several times of the slot length. In order to check whether the waiting mean of nodes varies with the space between the nodes, the space in the scenario is changed but the traffic distribution of the node in the scenario remains constant. For all scenarios, length of messages remains unchanged and the length of every message is equal to the length that a slot carries. The traffic distribution among nodes affects the waiting mean of nodes. Thus the distribution of traffic changes along with scenarios so as to examine the "ideal fair behavior" of optical TDMA networks.

For easily implementing traffic control, a basic traffic represented by $T_B$ is used as a basis for traffic distribution. The amount of $T_B$ is determined by the traffic distribution in every scenario. In a scenario, the traffic of each node is several times of the amount of $T_B$. That means the possible minimum node traffic in the scenario is $T_B$. Based on the introduction of $T_B$, not only the traffic distribution in various optical TDMA networks is easily to be defined, but the traffic control can also be accomplished easily in combination with various traffic distributions.

The embodiment of the MAC protocol that implements traffic control is described as below. The MAC protocol performs traffic control by frames. The slot flow on the optical fiber is partitioned into a plurality of frames. Each frame contains $1/T_B$ slots. When a frame arrives at the $n^{th}$ node, messages to be transmitted in the node are written into empty slots in the frame. The maximum number of messages that can be written out consecutively in a frame must be less than or equal to $T(n)/T_B$, wherein $T(n)$ is the traffic of the $n^{th}$ node. The maximum number of messages being written consecutively has to be loaded into a countdown counter before arriving of the frame. When the number of messages in the queue is equal to or greater than $T(n)/T_B$, the maximum value of the countdown counter is equal to $T(n)/T_B$. Otherwise the maximum value of the countdown counter is equal to the number of messages in the queue. Then the counter counts down when one of the messages is sent out. Once the countdown counter returns to zero, the node immediately stops sending the messages out. Then, the rest of the messages in the queues starts to be sent out when the next frame arrives to initiate another traffic control cycle as mentioned above.

The purpose of the network simulation is to examine whether the optical TDMA network matches the feature of "ideal fair behavior" or not. The examined optical TDMA network requires MAC protocol that implements traffic control. The "ideal fair behavior" means that the waiting mean of a node on the optical TDMA network doesn't change with its relative position in the network as its traffic is not changed. The relative position of the node includes nodal positions and the space among nodes. Therefore, the traffic distribution and the space among nodes are changed along with simulated scenarios.

On the other hand, the equation (8) that represents the analytical waiting mean of nodes is used to confirm simulative results. The rms (root mean square) difference between the simulative and analytical data, represented by $D_{rms}$, is defined by the equation (9):

$$D_{rms} = \left( \frac{1}{N-1} \sum_{n=0}^{N-2} (\mu_s(n) - \mu(n))^2 \right)^{1/2} \quad (9)$$

wherein $\mu_s(n)$ and $\mu(n)$ represent simulated waiting mean and analytic waiting mean of the $n^{th}$ node respectively.

In the following figures of simulative results, the number on the horizontal axis is the ordinal number of nodes. The ordinal numbers of nodes are discrete so that all curves in figures are formed by a plurality of lines. The unit of the waiting mean of nodes on the vertical axis is expressed in slot time.

In order to know the influence of node traffic on both waiting means and "ideal fair behavior" in optical TDMA networks, three traffic patterns are used in simulations. Among the three traffic patterns, the traffic of each node is several times the amount of $T_B$. The optical fiber is a one-way bus and all messages are not sent out of the network so that the $(N-1)^{th}$ node does not generate any traffic in all traffic patterns. In the first traffic pattern, let $T_1(n)$ denote the traffic of the $n^{th}$ node and the $T_1(n)$ is defined by equation (10):

$$T_1(n) = (N-n-1)T_B, n=0,1,\ldots,N-2 \quad (10)$$

In this pattern, the node most close to the slot generator has maximum traffic while traffic of other nodes reduces along with the increasing ordinal number of nodes. Based on this, in a frame, the maximum number of slots the $n^{th}$ node can capture is (N−n−1).

Due to the network under full load, $$1 = \sum_{n=0}^{N-2} T_1(n) = \sum_{n=0}^{N-2} (N-n-1)T_B = N(N-1)T_B/2 \qquad (11)$$

Thus in the first traffic pattern, the number of slots in a frame, denoted by $F_1$, is:

$$F=1/T_B=N(N-1)/2 \qquad (12)$$

Figure 2:
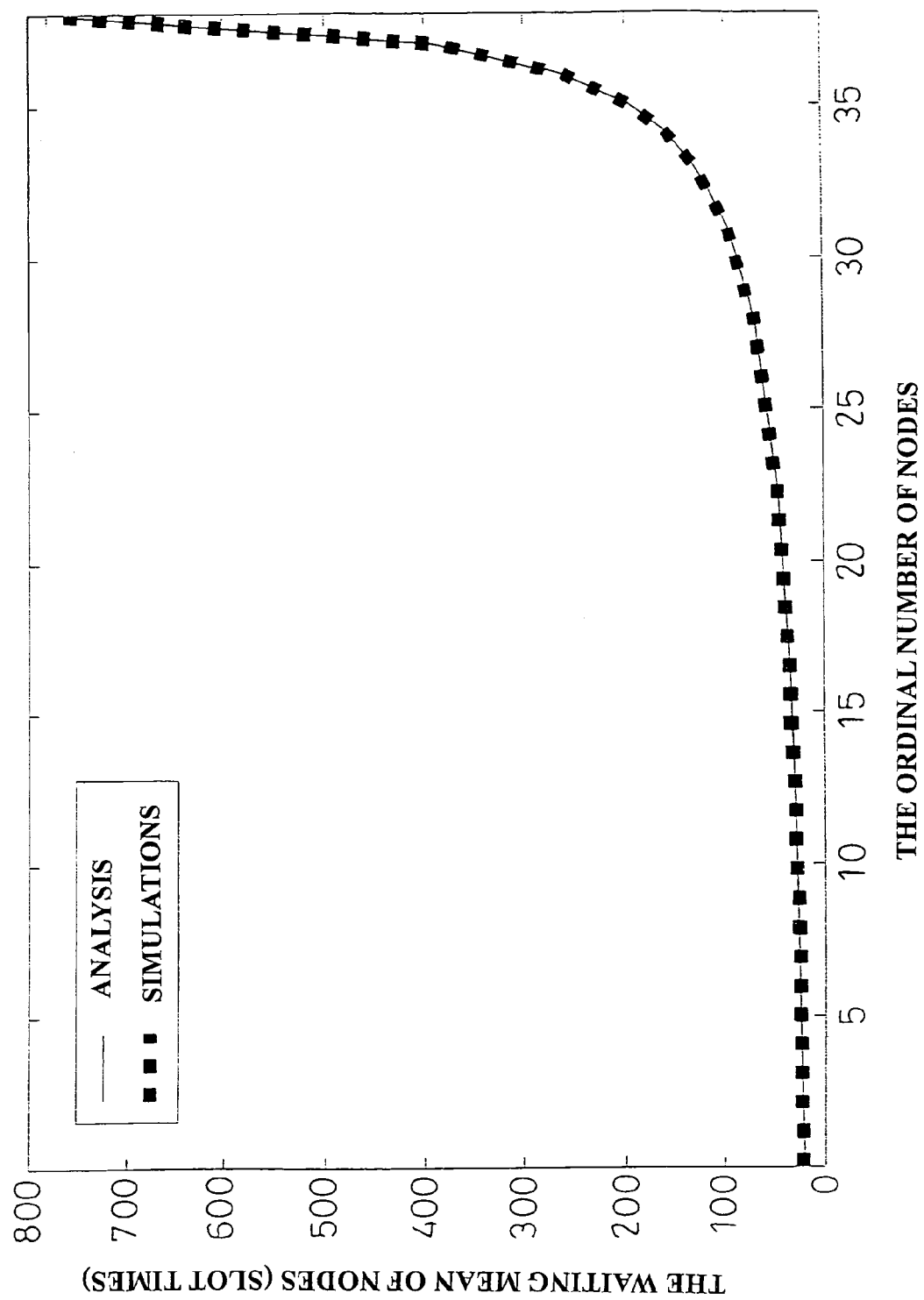
FIG. 2 shows the waiting mean of $T_1(n)$ on the network.

The simulation results corresponding to the first traffic pattern is shown in FIG. 2. The simulated network has forty nodes. The solid curve shows changes of the analytic waiting mean of nodes and the dotted curve represents changes of the simulated waiting mean of nodes. The two curves are almost overlapped completely. The rms difference between the data of two curves is calculated in the following equation:

$$D_{rms} = \left( \frac{1}{N-1} \sum_{n=0}^{N-2} (\mu_s(n) - \mu(n))^2 \right)^{1/2} = 0.073485. \qquad (13)$$

The rms value approaches zero. This result not only verifies the deduction of the waiting means of nodes in this embodiment but also confirms the precision of the simulation of optical TDMA networks.

In the second traffic pattern, the traffic of the node increases along with the increasing ordinal number of nodes. Let $T_2(n)$ represent the traffic of the $n^{th}$ node. The amount of $T_2(n)$ is defined by the following equation:

$$T_2(n)=(n+1)T_B, n=0, 1, \ldots, N-2. \qquad (14)$$

Figure 3:
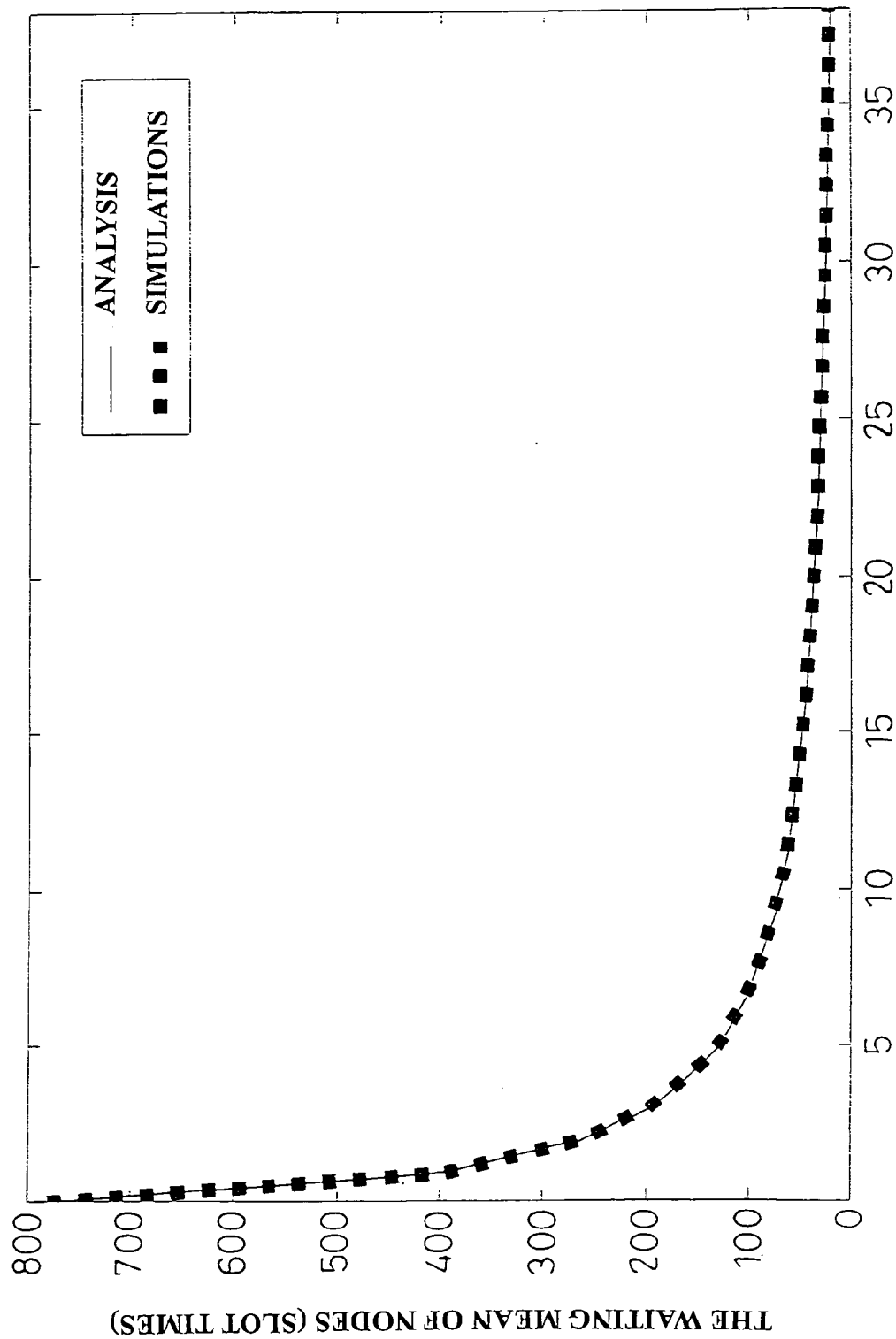
FIG. 3 shows the waiting mean of $T_2(n)$ on the network.

In this pattern, the node most close to the slot generator has minimum traffic while traffic of other nodes increases along with the increasing ordinal number of nodes. Based on this, in a frame, the maximum number of slots the $n^{th}$ node can seize is (n+1). The number of slots in a frame, denoted by $F_2$, is (N(N−1))/2, the same with (equal to) $F_1$. The FIG. 3 shows changes of the waiting mean of nodes in networks with the second traffic pattern. The solid curve and the dotted curve respectively show changes of the analytic waiting mean and the simulated waiting mean of nodes. The two curves are almost overlapped completely. The rms difference between the data of two curves is 0.047958. Let $n_1$ and $n_2$ represent the ordinal numbers of nodes in FIG. 2 and FIG. 3 respectively. Compared changes in FIG. 2 with those in FIG. 3, the result shows that the waiting mean of the $n_1^{th}$ node is equal to that of the $n_2^{th}$ node once $T_1(n_1)$ equals $T_2(n_2)$ no matter $n_1$ is equal to $n_2$ or not. This means that the waiting mean of every node is only dependent on its own traffic and is irrelevant to its own position in the network when the MAC protocol of optical TDMA networks implements traffic control.

By comparison of above two simulations, it can be predicted that the waiting mean of each node is equal once the network traffic is distributed evenly. Let $T_3(n)$ denote the traffic of the $n^{th}$ node in the third traffic pattern. Then for all nodes, $T_3(n)=1/(N-1)=T_B$. Each frame contains the number of K(N−1) slots, wherein K is a positive integer. In a frame, the maximum slot number that each node can seize is K. In this simulation, the K selected is 2. The simulation result of even-distributed traffic is shown in FIG. 4.

Figure 4:
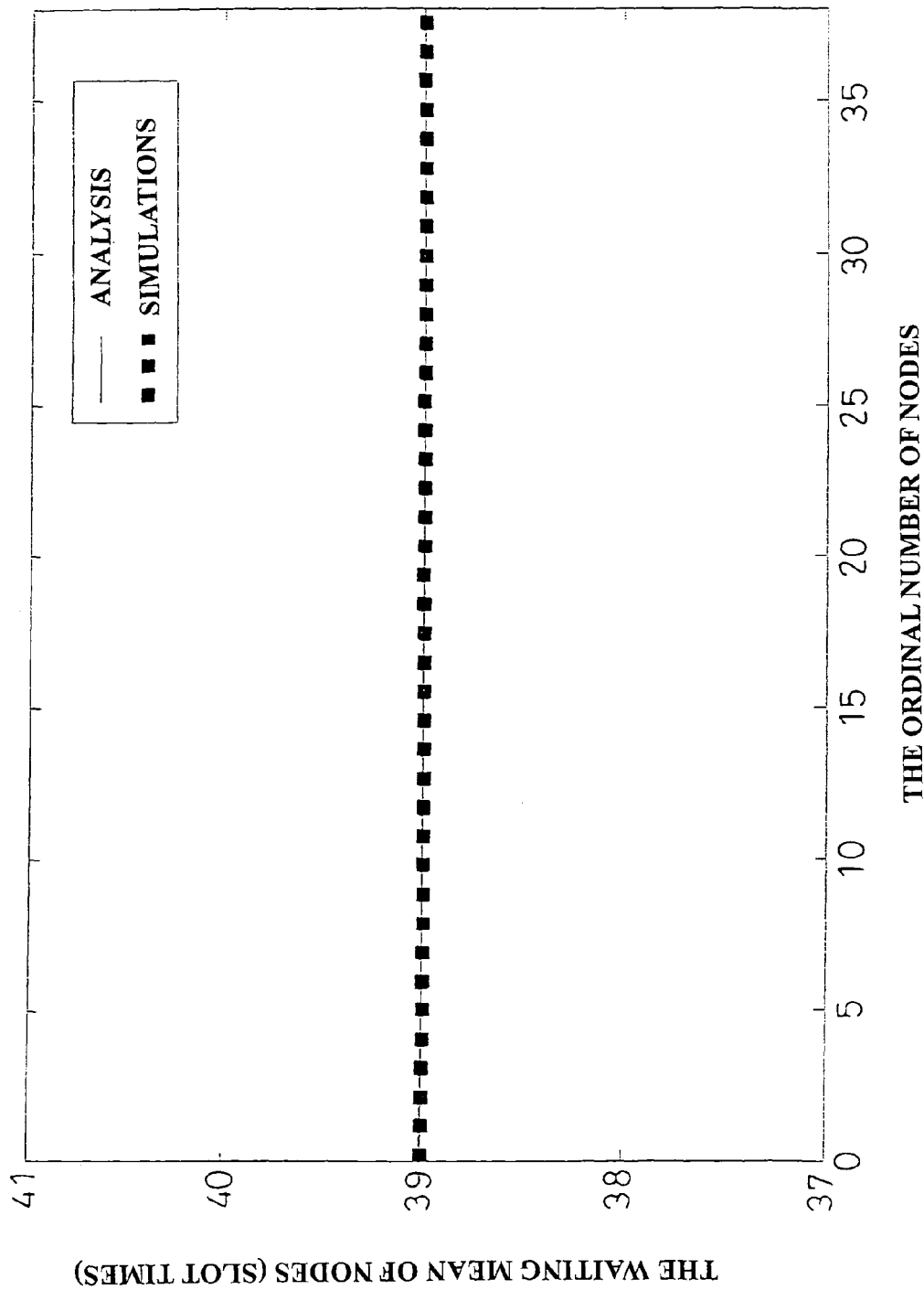
FIG. 4 shows the waiting mean of $T_3(n)$ on the network.

In FIG. 4, the solid curve and the dotted curve respectively represent changes of the analytic waiting mean and the simulated waiting mean of nodes. The two curves are overlapped almost completely. The rms difference between the waiting means of two curves is 0.003766. The waiting means of all nodes are almost equal to one another and this matches the predicted result.

Figure 5:
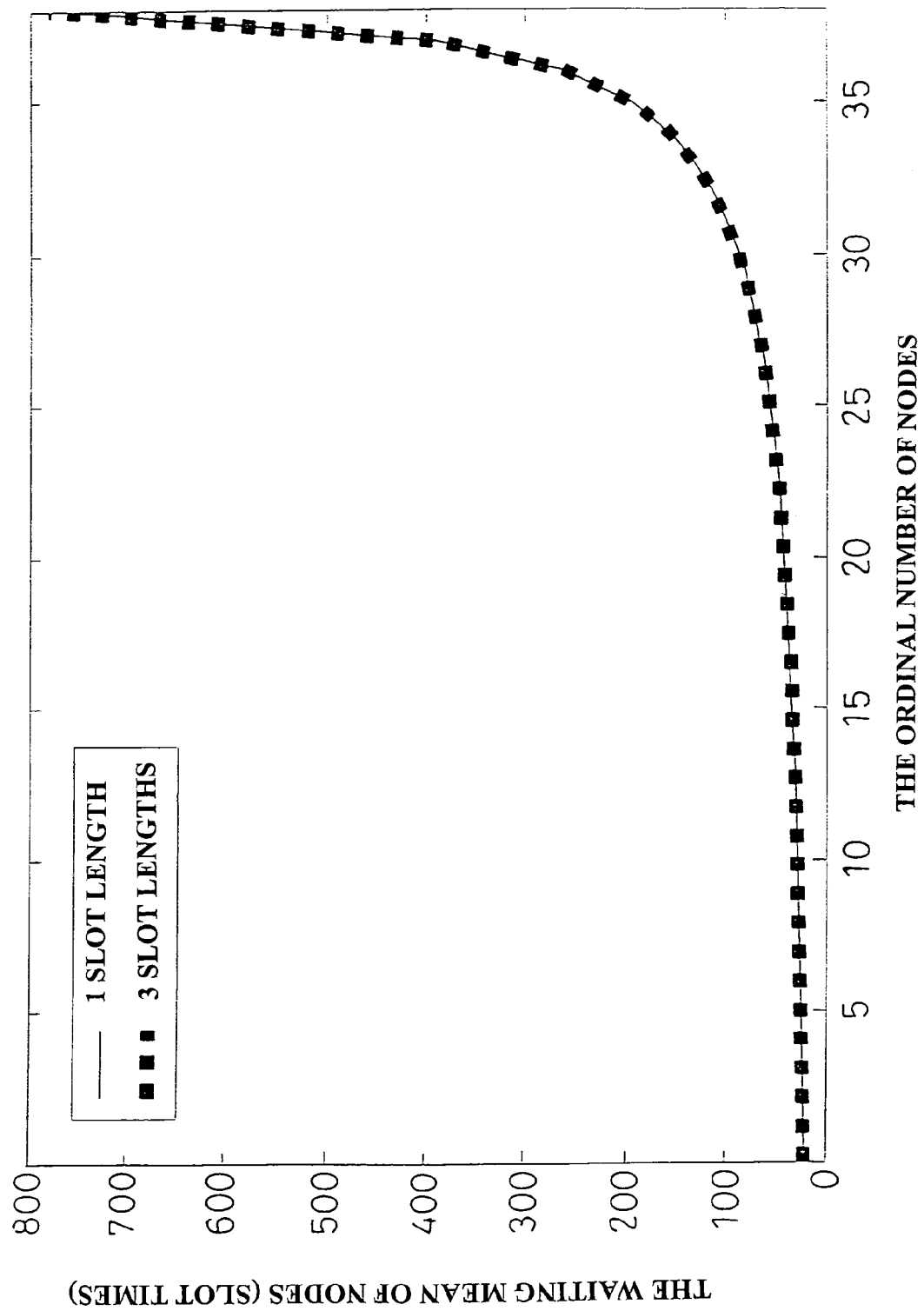
FIG. 5 shows effects of spaces on waiting means of $T_1(n)$ corresponding to a first traffic pattern.
Figure 6:
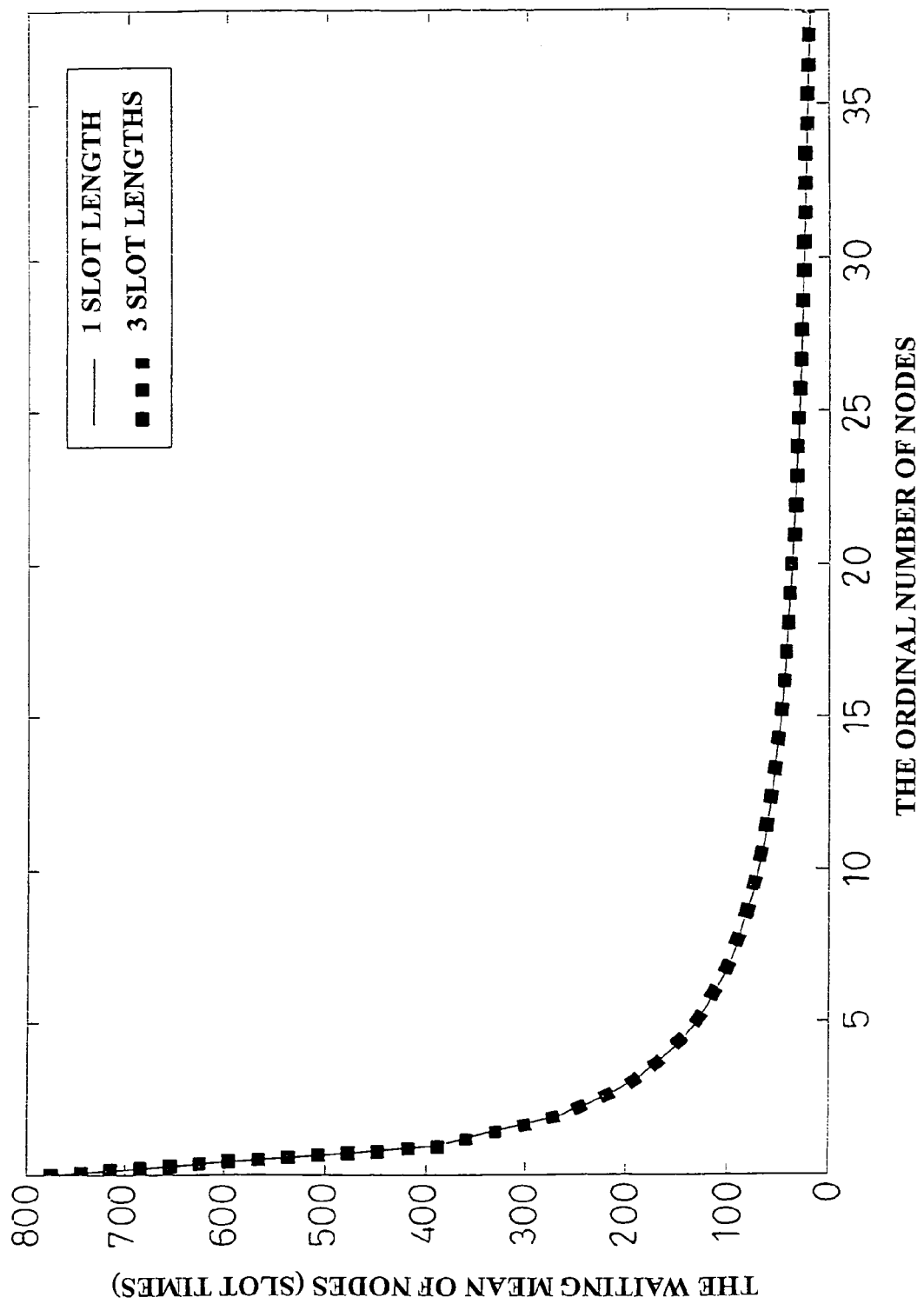
FIG. 6 shows effects of spaces on waiting means of $T_2(n)$ corresponding to a second traffic pattern.
Figure 7:
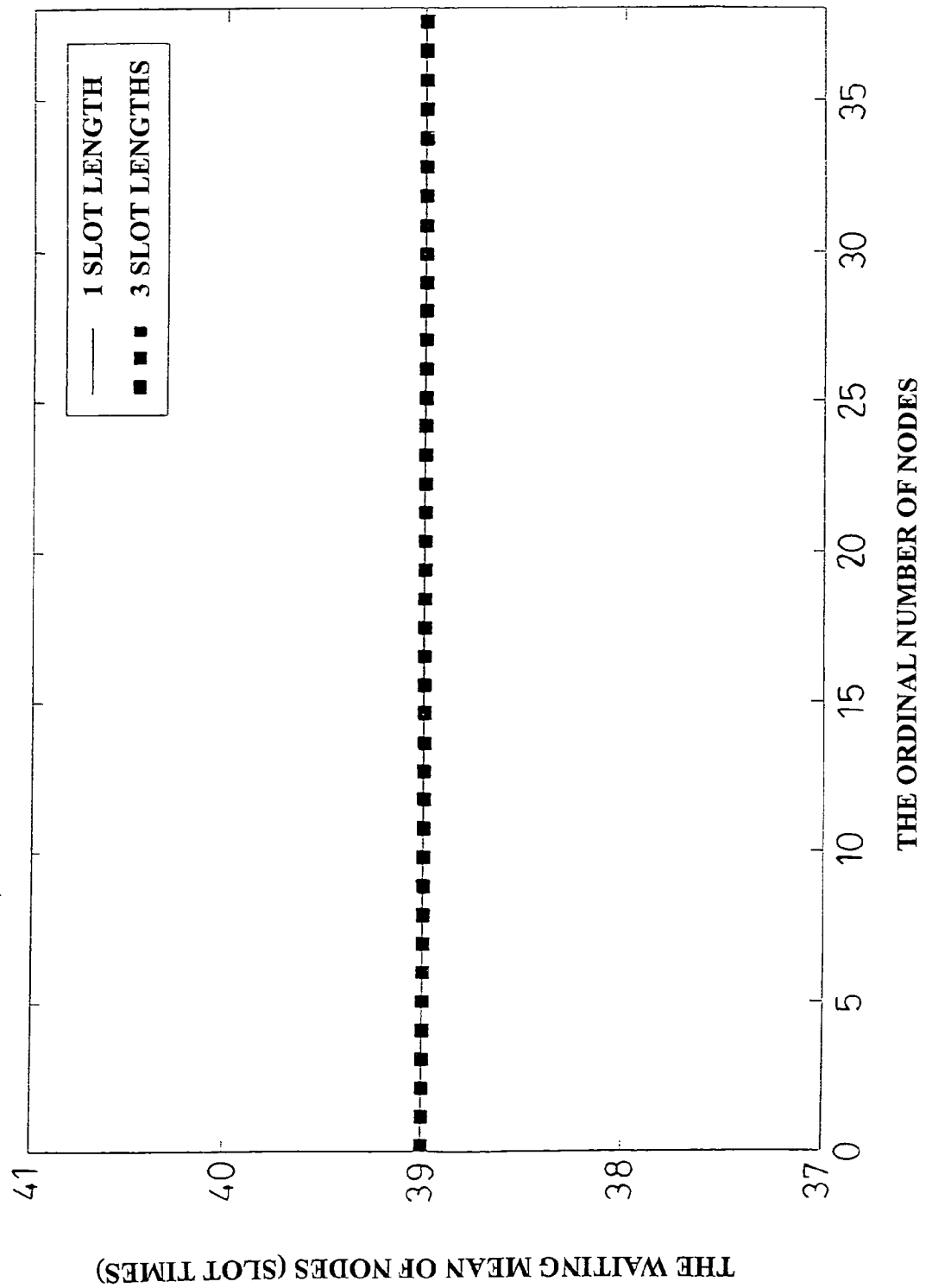
FIG. 7 shows effects of spaces on waiting means of $T_3(n)$ corresponding to a third traffic pattern.

The following simulation is used to check the effect of the space between adjacent nodes on the waiting means. In the previous three scenarios of simulation, the space between nodes equals one slot length while in the following simulative scenarios, the space between the nodes raises into three slot lengths and other working conditions remains, similar to those of the previous three scenarios. The FIG. 5, FIG. 6 & FIG. 7 are respectively the simulative results corresponding to the three traffic patterns and the space between the nodes includes one and three slot lengths.

In these three figures, the solid curve represents the simulated data of the traffic pattern in which the space between adjacent nodes is one slot length while the dotted curve represents the simulated data of the traffic pattern in which the space between adjacent nodes is three slot lengths. The two curves are almost overlapped. The rms differences between the two curves are 0.001235, 0.03755 and 0.000176 corresponding to FIG. 5, FIG. 6 and FIG. 7 respectively. The value of each rms difference approaches zero. This indicates that the waiting mean of nodes is not affected by the length of the space.

In summary, the above simulation results demonstrate that the waiting means of nodes are irrelevant to the network topology when the MAC protocol of the optical TDMA network implements traffic control. Thus, the medium access in optical networks can be distributed logically and effectively among the nodes by the method of the present invention so as to improve unfair access in the optical networks. Therefore, the optical TDMA network is suitable to construct MANs (Metropolitan Area Networks), LANs (Local Area Networks) or subnetworks of public networks for reducing constructional cost of networks, increasing bandwidth utilization and improving communicative performance.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A medium access control method for an optical fiber time-division multiple access (TDMA) network, wherein wherein the network comprises a slot generator coupled to a first end of an optical fiber bus, a plurality of network devices respectively coupled to the optical fiber bus to form a plurality network nodes corresponding thereto, and a slot terminator coupled to a second end of the optical fiber bus, the method comprising the steps of:

(a) the slot generator partitioning a slot flow on the optical fiber bus into a plurality of frames and each frame containing a plurality slots;

(b) the plurality of network devices at the plurality of network nodes respectively writing messages into empty slots in a frame consecutively and by the $n^{th}$ network node when the frame arrives at the $n^{th}$ network node and a maximum number of messages that are consecutively written out is less than or equal to a predetermined amount based on an amount of traffic of the $n^{th}$ network node;

(c) each network device at corresponding network nodes setting a countdown counter to a value of a maximum number of messages which will be consecutively written out before arrival of the frame; when a number of messages in a queue is greater than the predetermined amount, a maximum value of the countdown counter is equal to the predetermined amount, otherwise the maximum value of the countdown counter is equal to the number of messages in the queue;

(d) each network device at corresponding network nodes decrementing the countdown counter in correspondence with each of the messages in the queue being sent out; until the countdown counter returns to zero, the $n^{th}$ network node immediately stops sending out the messages in the queue, remaining messages in the queue will start to be sent out when a next frame arrives to initiate another traffic control cycle.

2. A medium access control method for an optical fiber time-division multiple access (TDMA) network, wherein the network comprises a slot generator coupled to a first end of an optical fiber bus, a plurality of network devices respectively coupled to the optical fiber bus to form a plurality network nodes corresponding thereto, and a slot terminator coupled to a second end of the optical fiber bus, the method comprising the steps of:

(a) the slot generator partitioning a slot flow on the optical fiber bus into a plurality of frames and each frame containing $1/T_B$ slots, where $T_B$ represents a basic traffic amount and traffic of each network node is several times of the amount of $T_B$;

(b) the plurality of network devices at the plurality of network nodes respectively writing messages into empty slots in a frame consecutively and by the $n^{th}$ network node when the frame arrives at the $n^{th}$ network node and a maximum number of messages that are consecutively written out is less than or equal to $T(n)/T_B$, where $T(n)$ represents an amount of traffic of the $n^{th}$ network node;

(c) each network device at corresponding network nodes setting a countdown counter to a value of a maximum number of messages which will be consecutively written out before arrival of the frame; when a number of messages in a queue is greater than $T(n)/T_B$, a maximum value of the countdown counter is equal to $T(n)/T_B$, otherwise the maximum value of the countdown counter is equal to the number of messages in the queue;

(d) each network device at corresponding network nodes decrementing the countdown counter in correspondence with each of the messages in the queue being sent out; until the countdown counter returns to zero, the $n^{th}$ network node immediately stops sending out the messages in the queue, remaining messages in the queue will start to be sent out when a next frame arrives to initiate another traffic control cycle.

* * * * *